(12) United States Patent
Derbanne

(10) Patent No.: US 8,498,447 B2
(45) Date of Patent: Jul. 30, 2013

(54) METHOD OF EVALUATING THE HORIZONTAL SPEED OF A DRONE, IN PARTICULAR A DRONE CAPABLE OF PERFORMING HOVERING FLIGHT UNDER AUTOPILOT

(75) Inventor: Thomas Derbanne, Paris (FR)

(73) Assignee: Parrot, Paris (FR)

( * ) Notice: Subject to any disclaimer, the term of this patent is extended or adjusted under 35 U.S.C. 154(b) by 160 days.

(21) Appl. No.: 13/156,076

(22) Filed: Jun. 8, 2011

(65) Prior Publication Data

US 2011/0311099 A1 Dec. 22, 2011

(30) Foreign Application Priority Data

Jun. 22, 2010 (FR) ..................... 10 54945

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| | | | | |
|---|---|---|---|---|
| 2003/0194128 | A1* | 10/2003 | Tan et al. | 382/167 |
| 2008/0056617 | A1* | 3/2008 | Wei et al. | 382/300 |
| 2010/0021036 | A1* | 1/2010 | Chen et al. | 382/132 |
| 2010/0182480 | A1* | 7/2010 | Nakajima | 348/333.09 |
| 2010/0303338 | A1* | 12/2010 | Stojancic et al. | 382/154 |

OTHER PUBLICATIONS

3D Pose Estimation Based on Planar Object Tracking for UAVs Control, May 2010, Ivan F. Mondragon, Pascual Campoy, Carol Martinez and Miguel A. Olivares-Mendez.*
Design Through Operation of an Image-Based Velocity Estimation System for Mars Landing; Jan. 2007, Andrew Johnson, Reg Wilson, Yang Cheng, Jay Goguen, Chris Leger, Miguel SanMartin and Larry Matthies.*
Larry Mathies et al., "Computer Vision Mars", International Journal of Computer Vision,vol. 75,No. 1,. Mar. 20, 2007,pp. 67-92.
Ivan F. Mondragon et al., "3D Pose Estimation Based on Planar Object Tracking for UAVs Control", 2010 IEEE International Conference on Robotics and Automation, pp. 35-41.
Andrew Johnson et al. "Design Through Operation of an Image-Based Velocity Estimation System for Mars Landing", International Journal of Computer Vision, vol. 74, No. 3, Jan. 17, 2007, pp. 319-341.

* cited by examiner

*Primary Examiner* — Stephen R Koziol
*Assistant Examiner* — Delomia Gilliard
(74) *Attorney, Agent, or Firm* — Haverstock & Owens LLP

(57) ABSTRACT

The method operates by estimating the differential movement of the scene picked up by a vertically-oriented camera. Estimation includes periodically and continuously updating a multiresolution representation of the pyramid of images type modeling a given picked-up image of the scene at different, successively-decreasing resolutions. For each new picked-up image, an iterative algorithm of the optical flow type is applied to said representation. The method also provides responding to the data produced by the optical-flow algorithm to obtain at least one texturing parameter representative of the level of microcontrasts in the picked-up scene and obtaining an approximation of the speed, to which parameters a battery of predetermined criteria are subsequently applied. If the battery of criteria is satisfied, then the system switches from the optical-flow algorithm to an algorithm of the corner detector type.

10 Claims, 4 Drawing Sheets

(Optical flow)

(Corner detector)

(Estimator selection)

METHOD OF EVALUATING THE HORIZONTAL SPEED OF A DRONE, IN PARTICULAR A DRONE CAPABLE OF PERFORMING HOVERING FLIGHT UNDER AUTOPILOT

FIELD OF THE INVENTION

The invention relates to piloting drones, in particular rotary wing drones such as helicopters, quadricopters, or the like.

BACKGROUND OF THE INVENTION

A typical example of such a drone is the AR.Drone from Parrot SA, Paris, France, which is a quadricopter fitted with a series of sensors (three-axis accelerometers and gyros, altimeter). The drone is also provided with a front camera capturing an image of the scene towards which the drone is headed, and a vertically-oriented camera capturing an image of the terrain over which the drone is flying.

The drone may be piloted by a user by means of a remote-control device that is connected to the drone over a radio link. The drone is also provided with an automatic system for stabilized hovering flight, serving in particular to enable the drone to reach an equilibrium point in automatic manner, and once said equilibrium point has been reached, serving to provide the trimming corrections needed for maintaining the fixed point, i.e. by correcting small movements in translation due to external effects such as movements of the air and drift of the sensors. The altimeter, which is an ultrasound telemeter located under the drone, provides a measurement of vertical speed that makes it possible to servo-control the thrust force in order to stabilize the height of the drone. Furthermore, the inertial sensors (accelerometers and gyros) serve to measure the angular velocities and attitude angles of the drone with a certain amount of accuracy, and can therefore be used for dynamically servo-controlling the thrust direction of the drone along the direction opposite to that of gravity.

In order to establish hovering flight, there remains a problem of eliminating the linear speed of the drone. Unfortunately, the low cost accelerometers that are used are generally too noisy to give a satisfactory estimate of the speed of the drone once the signal from them has been integrated twice. WO 2009/109711 A2 (Parrot) proposes estimating the horizontal speed of the drone from the image of the forward-looking camera by analyzing the succession of images picked up by said camera and identifying the movements of various characteristic points in the image.

Nevertheless, that technique suffers from lack of accuracy, particularly at the slowest speeds (when the drone is moving forwards at low speed, the scene captured presents very little change from one image to the next). It is also extremely dependent on the presence or absence of characteristic points of interest in the scene captured by the camera: when the image is uniform, e.g. showing a wall or the sky, when outside, the quasi-absence of characteristic points make that technique ineffective.

The present invention relies on using the image delivered not by the forward-looking camera, but rather by the vertically-oriented camera, in order to evaluate the horizontal speed of the drone.

Nevertheless, identifying the movement of the various points in the image picked up by said camera remains a task that is difficult and that depends strongly simultaneously on i) the nature of the scene (more or less contrast, changing to a greater or lesser extent); ii) the speed; and iii) the constraints of limiting the complexity of the calculations.

In particular, if it is desired to perform automatic stabilization servo-control while hovering, it is appropriate to have a speed measurement that is simultaneously accurate, sensitive (since linear speeds around the equilibrium point may be very low), and available in real time so that the servo-control can be performed effectively and reactively.

Nevertheless, it should be observed that the invention is not limited to evaluating speed for the purpose of stabilizing hovering flight of the drone, and that it is applicable more generally to all flying configurations of the drone, even with movement values that are close to the maximum speed of the drone (about 5 meters per second (m/s)).

Various algorithms exist that enable a speed of movement to be estimated in a scene captured by a video camera.

A first type of algorithm is the so-called "optical-flow algorithm" on bases that are described in particular by the following:

[1] LUCAS B. D. and KANADE T., "An Iterative Image Registration Technique with an Application to Stereo Vision", *Proc. DARPA Image Understanding Workshop*, pp. 121-130, 1981; and

[2] HORN B. K. P. and SCHUNK B., "Determining Optical Flow", *Artificial Intelligence,* (17): pp. 185-204, 1981.

Reference may also made to:

[3] MONDRAGÓN I. et al., "3D Pose Estimation Based on Planar Object Tracking for UAVs Control", Proc. *IEEE Conf. on Robotics and Automation*, pp. 35-41, May 3-8, 2010, which describes a multiresolution technique for estimating the optical flow with different resolutions for piloting a drone while landing.

The optical flow method presents the advantage of imposing very few constraints on the scene (little contrast, little content). In addition, by using a "multiresolution" approach, it is possible to estimate both high speeds and low speeds. In contrast, that method is sensitive to rotation and changes of attitude and it does not make it possible to verify intrinsically the quality of the results given, i.e. the algorithm always delivers a result providing enough points present a large gradient, but said result is delivered even if it is meaningless.

To summarize, the optical flow method is an "all terrain" method capable of operating over a very wide range of speeds, but it delivers the result that is not always reliable, nor very accurate, in particular at low speed.

Another type of algorithm comprises so-called "corner detector" or "point-of-interest detector" algorithms the basis of which are set out for example in:

[4] ROSTEN E. and DRUMMOND T., "Fusing Points and Lines for High Performance Tracking", *IEEE International Conference on Computer Vision*, pp. 1508-1511, 2005, and

[5] ROSTEN E. and DRUMMOND T., "Machine Learning for High-Speed Corner Detection", *European Conference on Computer Vision*, pp. 430-443, 2006.

The corner-detector algorithm is accurate and robust, it takes rotation into account, and it is capable of detecting evaluation results that are aberrant and of eliminating them. Furthermore, its absolute accuracy is constant regardless of speed (unlike the optical flow method), which makes it possible to obtain excellent results, in particular at low speeds, which advantage is particularly appreciable if it is desired to use its results for stabilization and servo-control of hovering flight.

In contrast, that method imposes much greater constraints on the scene in terms of contrast and texture, which means that it is not applicable to all the situations that might be encountered.

Finally, under all circumstances, using the calculation result for servo-controlling certain autopilot controls of a drone requires said data to be available practically in real time, and in any event sufficiently quickly to ensure that the drone can be autopiloted with all the desired reactivity.

This constraint limits the possibility of implementing conventional algorithms that are often designed to be executed on computers having processors that are fast and memory capacities that are large.

OBJECTS AND SUMMARY OF THE INVENTION

One of the objects of the invention is to provide a novel method that combines the advantages of the two above-mentioned techniques, namely optical flow and corner detection, and to do so particularly, but not exclusively, in the context of detecting speed for servo-controlling the drone in hovering flight.

Another object of the invention is to be able to benefit from these advantages, even with scenes in which contrast may be very low and noise high, or even with scenes in which shapes that are identified in the image are capable of changing in appearance in unpredictable manner, as happens when a drone is overflying terrain that is very changeable and unpredictable.

Yet another object of the invention is to propose a method of measuring horizontal speed that is suitable for being implemented so as to deliver a real time measurement of the speed by means of an on-board computer incorporated in the drone, and thus having capacity that is limited in terms of calculation power.

To this end, the invention provides a method of evaluating the horizontal translation speed of a drone, in particular a drone including an altimeter suitable for measuring the altitude of the drone relative to the terrain over which the drone is flying, and a downwardly-looking vertically-oriented video camera suitable for picking up successive digital images of a scene of the terrain.

The method operates by estimating the movement of the scene picked up by the camera from one image to the next, and by applying to said estimated movement a scale factor that is a function of the measured altitude.

In a manner that is itself known, the estimation of the movement comprises: periodically and continuously updating a multiresolution representation of the pyramid of images type that models a given picked-up image of the scene at different, successively-decreasing resolutions; and for each new picked-up image, applying an optical flow type iterative algorithm to said multiresolution representation for estimating the differential movement of the scene from one image to the next.

In a manner characteristic of the invention, the method further comprises: obtaining, from the data produced by the optical-flow algorithm, at least one texturing parameter representative of the level of microcontrasts in the picked-up scene; obtaining an approximation of the horizontal translation speed of the drone; applying a first battery of predetermined criteria to said texturing parameter(s) and to said speed approximation; and if said first battery of predetermined criteria is satisfied, switching from the optical-flow algorithm to an algorithm of the corner detector type in order to estimate the differential movement of the scene from one image to the next. The texturing parameter is a parameter derived from the matrix:

$$\begin{bmatrix} \sum_E I_x^2 & \sum_E I_x I_y \\ \sum_E I_x I_y & \sum_E I_y^2 \end{bmatrix}$$

of the gradient components of the image, where $I_x$ and $I_y$ are the gradient components of the image and E is the set of points to which the gradient presents a norm greater than a predetermined first useful threshold.

The texturing parameter(s) may in particular be the value of the trace of said matrix, and the cardinal number of the set E of points for which the gradient presents a norm that is greater than a first predetermined useful threshold.

The first battery of predetermined criteria for deciding whether to switch from the optical-flow algorithm to the corner-detector algorithm may in particular comprise the following conditions cumulatively: the value of the trace is greater than a second given threshold; and the value of the cardinal number is greater than a third given threshold; and the speed estimate is less than a fourth given threshold.

When the selected algorithm is the corner-detector algorithm and the speed approximation is less than a fifth threshold, the corner-detector algorithm is advantageously also adapted by modifying, for at least some selected trackers, the search parameters of the tracker and the dimensions of the search zone in the image in a restrictive direction. Provision is also advantageously made under such circumstances to activate an autopilot mode of servo-controlling the drone in position.

In a second aspect of the invention, the method also comprises, after switching to the corner-detector algorithm: obtaining from data produced by the corner-detector algorithm, at least one parameter representative of the risk of failure in estimating the differential movement of the scene from one image to the next by the corner-detector algorithm; obtaining an approximation of the horizontal translation speed of the drone; applying a second battery of predetermined criteria to the failure risk parameter(s) and to the speed approximation; and if the second battery of predetermined criteria is satisfied, switching back to the optical-flow algorithm in order to estimate the differential movement of the scene from one image to the next. The failure risk parameter may in particular comprise the number of locked-on trackers used by the corner-detector algorithm.

The second battery of predetermined criteria for deciding whether to switch back to the optical-flow algorithm may in particular comprise either of the following conditions: the number of locked-on trackers being less than a sixth given threshold; or the speed estimate being greater than a seventh given threshold.

Finally, the method may provide for counting the number of successive images that have been picked up since switching from a first algorithm, the optical-flow algorithm or the corner-detector algorithm, to the other algorithm, and making any return to the first algorithm conditional on counting some minimum number of images since the switch to the other algorithm.

BRIEF DESCRIPTION OF THE DRAWINGS

There follows a description of an implementation of the invention given with reference to the accompanying drawings.

MORE DETAILED DESCRIPTION

There follows a description of an implementation of the invention.

Figure 1:
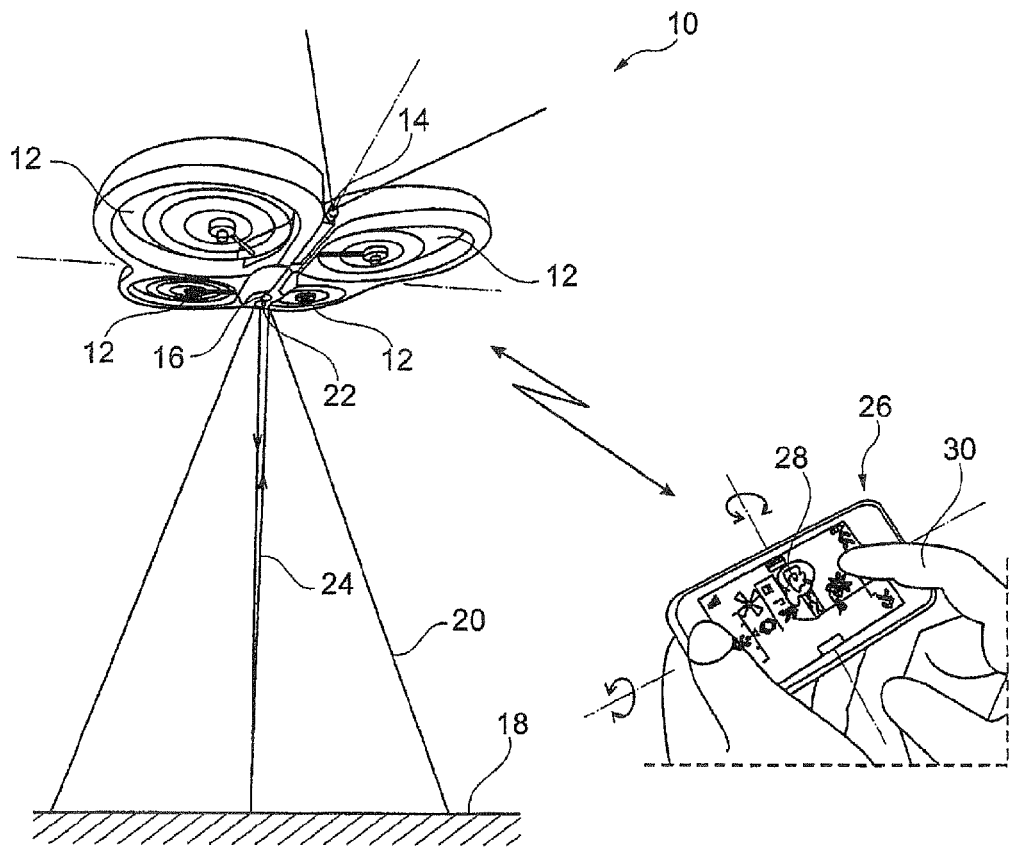
FIG. 1 is an overall view showing the drone and the associated remote control appliance enabling it to be piloted remotely.

In FIG. 1, reference 10 is an overall reference to a drone, e.g. a quadricopter such as the AR.Drone model from Parrot S A, Paris, France. The drone 10 has four coplanar rotors 12 having their motors controlled independently by an integrated flying and attitude-control system.

The drone 10 also includes a forward-looking first camera 14 serving to obtain an image of the scene towards which the drone is headed, and a downwardly-looking vertically-oriented camera 16 suitable for picking up successive digital images of the terrain 18 over which the drone is flying. The viewing angle of this camera, shown diagrammatically at 20, may for example have a diagonal of 64° with a resolution of 176×144 pixels (these values naturally being given purely by way of illustration).

The drone 10 is also provided with an ultrasound altimeter 22 that emits a beam 24 towards the ground serving to determine at all times the altitude of the drone relative to the ground. This information is used in particular for estimating a scale factor to be applied to the image picked up by the camera 16 so as to be able to transform the movement of the scene in the image as picked up into information concerning speed relative to the terrain 18.

Finally, the drone includes inertial sensors (accelerometers and gyros) serving to measure the angular speeds and attitude angles of the drone with a certain amount of accuracy.

The drone 10 may be piloted using a remote control appliance 26, e.g. an appliance having a touch screen 28 displaying the image picked up by the forward-looking camera 14, together with a certain number of symbols superposed thereon for the purpose of enabling a user to activate piloting commands merely by touching the screen 28 with a finger 30. The remote control appliance 26 is also provided with tilt sensors enabling the attitude of the drone to be controlled by tilting the remote control appliance in corresponding manner about roll and pitching axes.

The drone is also provided with an independent system for stabilizing hovering flight in the absence of any external command applied by a user.

The system serves to deliver the corrections needed to maintain equilibrium at a fixed point by issuing appropriate trim commands, i.e. commands for correcting the minimal movements in translation due to external effects such as movements of the air and drift of the sensors.

In order to be able to operate, the automatic stabilizer system needs to have speed information, in particular information about the horizontal linear speed in translation of the drone.

The invention proposes using the vertically-looking video camera 22 with which the drone is provided in order to deduce the direction and the amplitude of said linear speed from the movement of shapes that are detected and tracked between successive images, as a function of the transformations in the image of the scene picked up by said camera.

The following assumptions are made:

firstly, it is assumed that the scene is a "flat" scene, i.e. that the terrain 18 is horizontal. The on-board telemeter provides a measurement of the distance from the drone to the scene (terrain 18), but the technology used (ultrasound) does not make it possible to determine the exact point in the image for which this distance is evaluated. It is therefore assumed that altitude varies little over the scene relative to the data provided by the telemeter, and it is assumed that all points in the scene are situated at the same distance from the focal plane of the image, ignoring any influence of scene depth. Specifically, this assumption is usually true whenever the camera and the telemeter are looking at the ground;

secondly, it is assumed that the illumination of the scene is constant and implicitly that the response of the camera is constant; and finally, it is assumed that the scene under observation is rigid, so as to limit difficulties in estimating speed from a sequence of images.

Algorithm Based on a Constant Optical Flow

There follows a description of the main characteristics of this type of algorithm, which is itself known, in particular from above-mentioned publications [1] and [2], to which reference may be made for further details.

In particular, it is possible to use the Lucas-Kanade estimation method, which is particularly simple and fast, providing the optical flow is locally constant, i.e. providing the movement therein is the same for each point in the scene picked up by the camera (this assumption is true providing the scene is accurately plane, providing the movement is parallel to the focal plane of the camera without rotation about the optical axis, and providing the illumination of the scene is constant).

The drawback of this method is that it relies on a Taylor approximation of the image signal, thereby reducing the maximum speed that can be detected reliably to only a few pixels.

Figure 2:
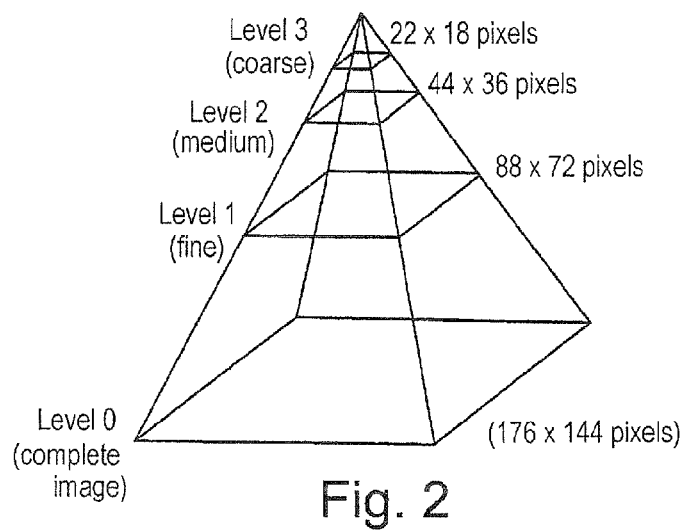
FIG. 2 is a diagram of a pyramid of images, i.e. a multi-resolution representation of the scene picked up by the vertically-oriented camera.

To mitigate that drawback, it is possible to increase the maximum speed that is theoretically detectable by a multi-resolution approach, by creating a series of successive reductions of the original image. This approach, also known as the "pyramid of images" is shown diagrammatically in FIG. 2: starting from the complete image (level 0), having resolution of 176×144 pixels in this example, the same image is reused at successive reductions by a factor of 2: level 1 on 88×72 pixels; level 2 on 44×36 pixels, and level 3 on 22×18 pixels.

The accuracy of the estimated optical flow is inversely proportional to the reduction that is performed, but the corresponding maximum detectable speed increases in proportion to the level of reduction.

The multiresolution approach consists in estimating the constant optical flow in the lowest resolution (here level 3), and then in reinjecting that result as a prediction for the following resolution (level 2). The advantage of working with a coarse version of the image (e.g. level 3) lies in the fact that only very small movements are allowed in the image and point tracking is therefore very fast. It is then possible to use the movement information as obtained in this way to predict movement in the image at a lower level. Progress is continued in this way from level to level until sufficient accuracy is achieved. Specifically, it suffices to begin the estimation at level 3 (three successive reductions) and to end at level 1 (one reduction), thereby enabling an accurate result to be obtained extremely quickly. Abandoning level 0 (full image) makes it possible to achieve a saving of about 75% of the calculations, thereby ensuring an effective compromise between calculation time and the accuracy of the result.

The prediction used at the lowest level (here level 1) is the last estimated speed, matched to the scale of this resolution.

Since a low resolution error gives rise to a greater error when resolution increases, it is appropriate to verify the likelihood of each prediction, by verifying that each successive estimate is in the same direction as the preceding estimate and as a smoothed signal when the estimates are greater than a certain threshold. The smoothed signal is obtained by exponentially smoothing the movements of the camera; it is also attenuated so as to tend towards zero if it is not updated soon enough in the event of a failure to estimate speed; if this were not done, this signal would itself become aberrant.

Figure 3:
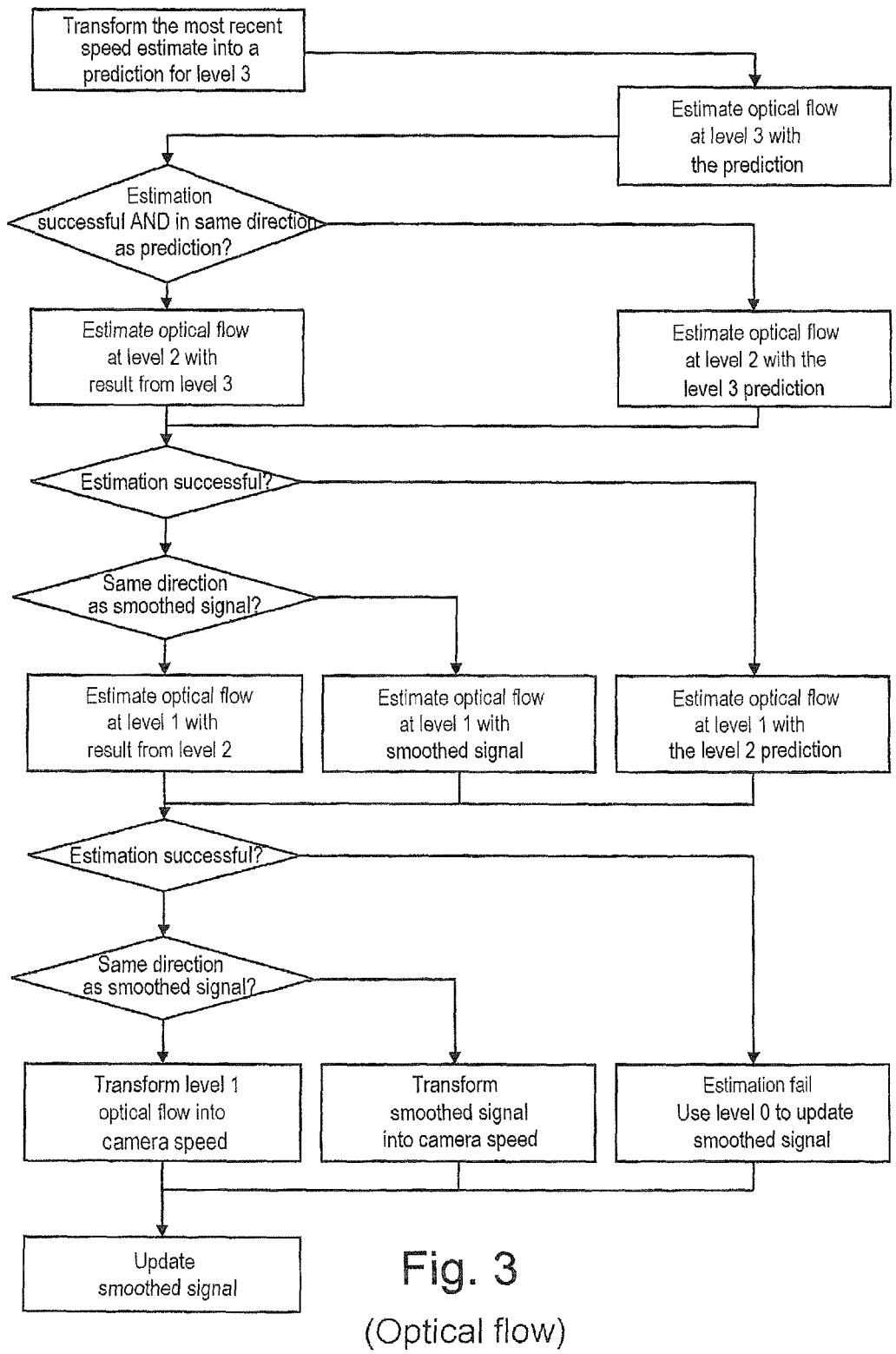
FIG. 3 is a general flow chart of the various steps of an algorithm of the optical flow type.

FIG. 3, in the form of a flow chart, sums up the various steps implemented by the above-described optical-flow algorithm.

After estimating the constant optical flow ($F_x$, $F_y$) by applying this algorithm, in order to deduce an estimate of the movement between two images, it suffices to perform a change of reference frame (in order to take on a reference frame other than that of the camera) and a change of scale (making use of the focal length Length of the camera and the distance Altitude to the scene):

$$\begin{bmatrix} T_x \\ T_y \\ T_z \end{bmatrix} = \frac{\text{Altitude}}{\text{Length}} R_{image/scene} \cdot \begin{bmatrix} F_x \\ F_y \\ 0 \end{bmatrix}$$

It is also appropriate to compensate for any rotation between the images used for estimating the optical flow. This rotation information is delivered by the inertial unit, and the errors that it is liable to introduce (rotations that add a component along the line of intersection between the image plane and the plane perpendicular to the axis of rotation) can be compensated by adding to the estimated flow the movement of the optical center that is due to rotation between two images:

$$\vec{F}_{final} = \begin{bmatrix} F_x \\ F_y \end{bmatrix} + G \cdot \left( proj \left( R_{rotation} \cdot \begin{bmatrix} C_x \\ C_y \\ \text{Length} \end{bmatrix} \right) - \begin{bmatrix} C_x \\ C_y \end{bmatrix} \right)$$

$R_{rotation}$ being the rotation that is to be compensated;
proj being the function that projects a point in space onto the screen;
($C_x$, $C_y$) being the center of the image; and
G being the gain of the compensation.

The compensation may be optimized by calculating an optimum gain G on a very large base. The resulting optimum gain, less than unity, is optimum only on average, since the ideal gain for zero translation is equal to unity. It may thus be more effective to conserve unity gain for a zero speed situation (servo-controlling the fixed point while hovering).

Compensating rotation enables the calculation to be made robust in the face of the rotations that are encountered while hovering, and above all to conserve a linear movement model that makes it possible to apply the prediction in a manner that is quasi-transparent in calculation terms (the shift of the entire image amounting to shifting a pointer).

Algorithm Based on Corner Detection

There follows a description of the main characteristics of this type of algorithm, which is itself known, in particular from above-mentioned publications [3] and [4], to which reference may be made for further details.

This algorithm operates by estimating the movement of various points of interest ("corners") in the image. For this purpose, it uses a so-called "tracker" structure serving to track a point of interest, which structure hosts the information needed for finding said point in the following image. When a tracker manages to follow a point from one image to the next, it is said to be "locked on"; otherwise it is said to be "lost".

A first analysis of the image serves to detect the points of interest, for example by using a corner detector of the type known as "feature from accelerated segment test (FAST)". Thereafter, the algorithm places trackers on these corners, after verifying that their content is valid, or it seeks the new position of a tracker on one of these points, the assumption being that a point of interest in one image often remains a point of interest in the following images. The search zone for a tracker in a new image is thus restricted to the list of positions of interest. It is also restricted as a function of the preceding movements of the tracker, in order to optimize calculation time and robustness.

The FAST corner detector is optimized to reduce the number of memory accesses, with a fixed contrast threshold and a fixed path radius, and with acquisition being performed on a version of the image that is reduced to 50%. The positions responding to the detector are stored in a table and marked on an image. The table gives fast access to the corners without putting any constraint on the positions thereof (for positioning new trackers), and the image enables them to be accessed in random manner (for seeking a positioned tracker).

The following step consists in predicting the future position of the tracker by double exponential smoothing. When the tracker is very slow, its predicted position is identified with its current position. The search rectangle for the tracker changes size as a function of the distance between the predicted position and the real position in the preceding image. The search radius is reduced when it is too large, and it is increased when it is too close to the real distance (the maximum radius being used for each newly-placed tracker).

When a tracker is placed on an image, an image fraction or "patch" of fixed size (e.g. 7×7 pixels) is recorded around its position, and it is this patch that is searched in the following images. The distance used for comparing different patches is the sum of the absolute differences:

$$\text{distance}(\text{tracker}, I_t, (x, y)) = \sum_{(u,v) \in [-3,+3]^2} |\text{tracker} \rightarrow \text{patch}(u, v) - I_t(x + u, y + v)|$$

In order to search for a tracker, the positions around the predicted position are scanned following a spiral path, and for each corner the distance to the descriptor is calculated, which distance is compared with three thresholds:
 a high threshold, beneath which testing of the eight immediate neighbors of the current position is allowed, even if they are not positions of interest;
 a low threshold, below which searching is stopped after a half-pixel search; and a medium threshold that authorizes a half-pixel search in order to pass the low threshold.

Since the corner detector does not respond only to genuine corners in the image, it can happen that undesirable positions are sometimes classified as being of interest.

These undesirable positions are positions around which the sum of the absolute differences is almost constant and noisy instead of presenting a well-marked minimum, as happens with a genuine corner. A minimum amount of contrast is thus required, and then a test is performed on each patch that is envisaged as being a potential descriptor. The binarized path serves, by means of the test, to determine whether the content is one-dimensional, and to reject or to accept the patch under analysis.

Figure 4:
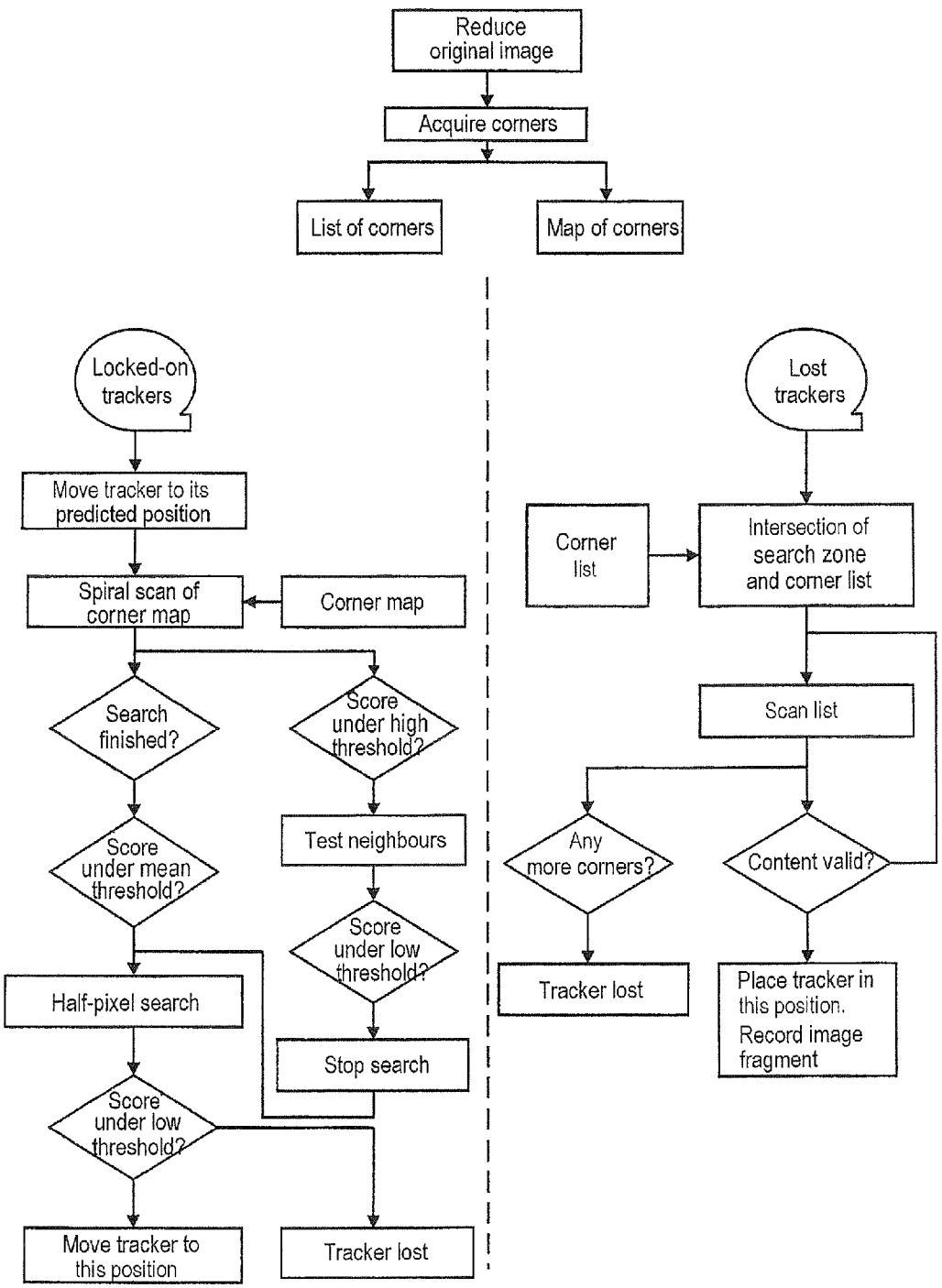
FIG. 4 is a general flow chart of the various steps of a corner-detector algorithm.

FIG. 4 is a flow chart summarizing the various steps implemented by the above-described corner-detector algorithm.

Once these various operations have been performed, in the context of estimating a speed for use in fixed point servo-control, it may be advantageous to modify corner detection so as to adapt it to very low speeds, in the manner that is described below and that is referred to as "gold mode".

When speed is low, the estimate is noisier; tracker accuracy remains limited to half a pixel, and the speed error therefore increases with increasing altitude. It may then be preferable to servo-control the position of the camera on a fixed position instead of canceling any speed.

In other words, in order to avoid drift (accumulation of errors, wind, etc.), it is preferred to servo-control the drone in position rather than in speed, so that the servo-control is independent of the speed value (which value is itself very low).

In order to provide servo-control relative to a position, and given that the trackers do not have any memory (it is not possible to find a lost tracker), it is necessary to rely on trackers that present a long lifetime. When the speed of the camera is low, it is thus possible to convert certain trackers into a special mode that makes them longer lasting. The algorithm used is indeed more complex, but this complexity is compensated by a smaller search zone.

To do this, an exhaustive search is performed by the tracker over a limited radius, followed by a half-pixel search. Furthermore, lowpass filtering is performed on the tracker's reference patch, and also on the patches with which the tracker is to be compared, thereby increasing the robustness when faced with interfering sampling phenomena such as aliasing (spectrum folding) and moiré pattering.

To convert to "gold" mode, it is necessary for the mean quantity of movement of the trackers to be below a given threshold, the trackers that have been locked on for some minimum number of images then being changed into "gold" trackers, with preference being given to central trackers.

When at least one tracker has been converted to "gold" mode, an additional movement in translation is estimated and it is not converted into a speed. Servo-control then seeks to return the camera to the position at which it was looking when "gold" mode was established, instead of compensating the most recent movements. Attempts are made regularly to add "gold" trackers, even if adding trackers involves updating the reference position with the current position.

The final step in evaluating speed by the corner-detector algorithm consists in estimating the movement in translation from one image to the following image.

Since the tracking algorithm provides the movement in the image of a plurality of points in the scene, and assuming that the scene is plane (which assumption is reasonable since the camera is looking at the ground), all that is missing from these points is depth information.

The movement of the camera is deduced from the movement of the trackers by minimizing the sum of iteratively re-weighted least-squares back projection errors (back projection errors being the distances between the positions found in the most recent image and the theoretical positions after the movement of the camera).

Instead of estimating the instantaneous speed, it is also possible to estimate movement between the acquisition instants of the latest image and of an earlier image, providing the quantity of movement of the trackers is greater than a threshold. This has the effect of minimizing the number of trackers available for calculation, but it correspondingly reduces the magnitude of the noise concerning the positions of the trackers, while smoothing the value of the finally estimated speed.

Selecting the More Appropriate Algorithm

As set out in the introduction, each of these two algorithms, i.e. optical flow and corner detection, presents its own advantages and drawbacks.

The originality of the present invention consists in using these two algorithms as alternatives, and at any given moment in selecting which one of them is better adapted to various constraints (speed low or high, scene having greater or lesser levels of contrast and texture, etc.).

With each newly-processed image, the question arises as to whether the algorithm should be changed for the next image, with this being done by determining which one of the algorithms can be expected, a priori, to give the better result.

Nevertheless, switching between algorithms is not without additional cost in terms of calculation time, so it is also important to determine whether, in the event of a changeover, the new algorithm will be in a position to function optimally once the first two successive images have been taken.

As explained above, both of the algorithms require a preprocessing stage that is applied initially, and an updating stage that is applied subsequently. Thus:

the algorithm based on optical flow creates a pyramid of images from each image captured by the camera, and at the end of processing it updates the old version of this pyramid of images; and the corner-detector algorithm requires corners to be acquired in a reduced version of the image during preprocessing, and its updating comprises replacing trackers on corners before the following image.

The corner-detector algorithm therefore cannot operate if corners have not already been acquired from the preceding image: without any corners, it is not possible to place any trackers, and therefore there will be no trackers to be tracked in the next image. It is not possible to envisage conserving old trackers since that would involve searching for them in an image zone that is too large, and that might also have been subjected to rotation in the mean time.

Unfortunately, even on a reduced image, acquiring corners is an operation that is expensive in terms of calculation time, so it must be possible to avoid this operation when it is unnecessary, i.e. if it is considered that the optical-flow algorithm is the better adapted.

In contrast, it should be observed that the preprocessing of the optical-flow algorithm is fast, and updating is inexpensive in terms of calculation time, since it can be performed merely by exchanging pointers. Furthermore, the first image reduction (going from level 0 to level 1) is beneficial to both algorithms, so it is never useless.

It is therefore appropriate to execute the preprocessing and the updating of the optical-flow algorithm every time, while executing the preprocessing and the updating of the corner-detector algorithm only when it is the better algorithm, in particular because speed is low.

Furthermore, the algorithm that is used by default is the optical-flow algorithm, since it is better adapted to scenes of any type.

Finally, each algorithm is given a certain amount of "credit", i.e. some minimum number of images after changing over from one algorithm to another, during which any reverse changeover to the first algorithm is prevented. This credit is typically 10 images for controlling switchover from optical flow to corner detection, but only a few images for the opposite switchover (so that the relatively lengthy corner acquisition preprocessing does not excessively delay calculating speed).

Figure 5:
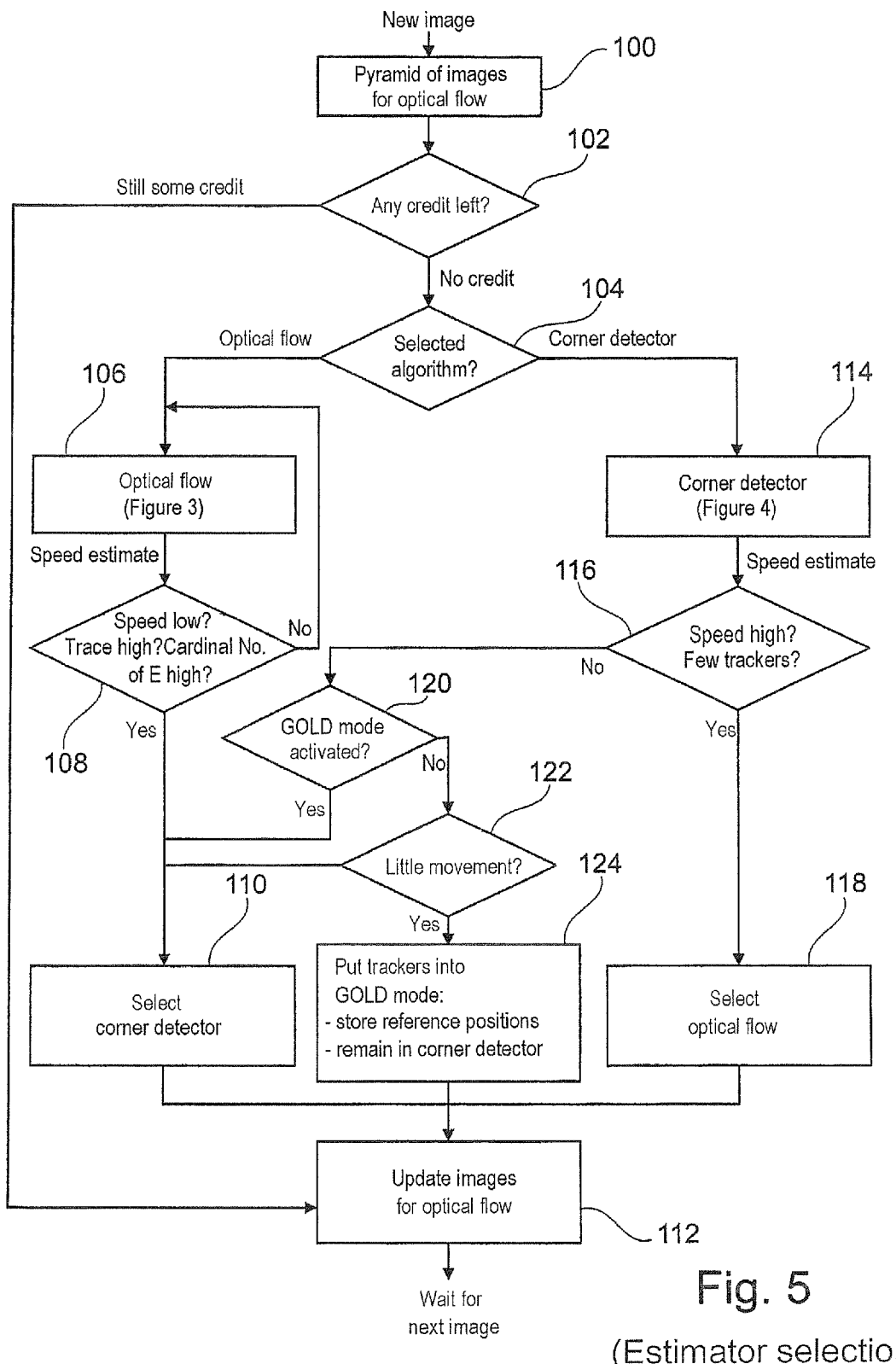
FIG. 5 shows the essential steps of the algorithm of the invention for selecting the estimator (optical flow or corner detector) as a function of a certain number of criteria for switching from one algorithm to the other.

With reference to FIG. 5, there follows a description of the algorithm for selecting which estimator algorithm is the better adapted.

As mentioned above, the pyramid of images is created and updated every time, for each new image (block 100). If some minimum number of images has elapsed (credit run out, test 102), and if the selected algorithm is optical flow (test 104), the problem is whether to make the transition from optical flow to corner detection. To do this, it is appropriate to decide whether the scene and the movement are appropriate for corner detection.

The optical-flow algorithm (block 106) already knows a version of the estimated speed, as used for predictions and consistency testing. This data is a good indication of the fast or slow trend of the movement. It is robust against coarse algorithm errors and it can even be reinjected as a prediction for the corner-detector algorithm.

In a variant or in addition, this speed estimate may be obtained from information delivered by the inertial unit.

As mentioned above, only the corner-detector algorithm requires special content in order to be capable of operating.

Nevertheless, implementing a scene content estimator would be difficult and would represent extra costs in terms of complexity if its sole purpose were to be for use in evaluating the potential advantage in switching from the optical-flow algorithm to the corner-detector algorithm.

Instead, use is made of a "by-product" of the optical-flow method of estimation. This method involves, on each image, calculating the Lucas-Kanade formula:

$$\begin{bmatrix} F_x \\ F_y \end{bmatrix} = \begin{bmatrix} \sum_E I_x^2 & \sum_E I_x I_y \\ \sum_E I_x I_y & \sum_E I_y^2 \end{bmatrix}^{-1} \cdot \begin{bmatrix} \sum_E I_x I_t \\ \sum_E I_y I_t \end{bmatrix}$$

$I_x$ and $I_y$ being the components of the gradient of the image; and

E being the set of points to which the gradient presents a norm (modulus) greater than a first predetermined useful threshold.

In this formula, the central square matrix for inversion:

$$\begin{bmatrix} \sum_E I_x^2 & \sum_E I_x I_y \\ \sum_E I_x I_y & \sum_E I_y^2 \end{bmatrix}$$

which is the matrix of the components of the gradient of the image, is calculated in any event.

It should be observed that insofar as conditions are such that the result is constant over the entire image, the matrix holds information about the gradients for the entire image, and that is why it is this matrix that is examined.

Use is made of the value of the trace of this matrix, which gives an estimate of the mean norm of the gradient over E.

If E contains sufficient points (i.e. if its cardinal number is greater than a given threshold) and if the value of the trace is sufficiently large, then that constitutes a good indication that the scene as picked up is textured, i.e. that it contains sufficient microcontrasts to enable the algorithm to be performed in satisfactory manner.

The decision thresholds should be adjusted as a function of the contrast threshold used in the corner detector.

Mathematically, it is not certain that a steep mean gradient will guarantee that corners are present, but statistically, the indicator works effectively and above it does not involve any additional calculation.

Since this "texture indicator" of the scene, on its own, is not capable of measuring a scene quality that guarantees a sufficient number of trackers in the event of the corner detector being used, it is necessary for it to be combined with other parameters.

The following are selected as representative parameters:
the number of points (cardinal number of E) used for the texture indicator, indicating whether the zone of interest is well distributed in the image; and
the speed estimate (the speed given by the smoothed signal averaged over several images), making it possible to determine whether the speed is "generally fast" or "generally slow".

Thus, if all three of the following conditions are united (test 108):
the score of the texture indicator (trace of the matrix) is higher than a first threshold; and
the number of points used (cardinal number E) is greater than a second threshold; and
the estimated speed is less than a third given threshold;
then it is decided to switch over (block 110) to the corner-detector algorithm.

The processing of the current image comes to an end with updating the pyramid of images, with this being done on all occasions (block 112), as mentioned above.

It is now assumed that the currently selected algorithm is the corner detector (block 114).

The question is thus to determine whether it would be preferable to return to the optical-flow algorithm, or else to remain with the corner-detector algorithm, and if so, whether or not it is appropriate to activate the above-explained "gold" mode for some trackers.

Insofar as the corner-detector algorithm does not make use of the Lucas-Kanade formula, the scene texture indicator that was used with the optical-flow algorithm is no longer available.

Nevertheless, it is possible to rely on the operation of the corner-detector algorithm to determine whether it is still appropriate to process the current image.

The number of trackers that are locked-on at the end of processing is not an indicator for the quality with which movement in translation has been estimated (and thus with which speed has been evaluated): it is possible to obtain a poor estimate while using a large number of trackers, or an excellent estimate while using only one tracker. Similarly, the similarity score obtained by a tracker with the image zone onto which it is moved is not associated with the positioning error. It is only by increasing the number of trackers that it is possible, on average, to guarantee a result that is satisfactory.

The number of locked-on trackers therefore provides an indicator concerning the risk of the corner-detector algorithm failing in the long run, a situation that could be avoided by switching over directly to the optical-flow algorithm (which almost never fails, but at the cost of a small increase in error).

The system thus returns to the optical-flow algorithm if one or other of the following two conditions is satisfied (test 116):

the smoothed speed estimate is greater than a given threshold; or the number of locked-on trackers is less than another given threshold.

If either of these conditions is satisfied, the opposite switchover is performed (block 118) to the optical-flow algorithm.

As before, the processing of the image comes to an end with updating the pyramid of images (block 112), since that is performed every time regardless of which algorithm is current.

If in test 116, it is found that the corner-detector algorithm should be maintained, then it is verified whether "gold" mode is activated (test 120):

if so, the current situation is conserved, with the corner-detector algorithm being maintained as is (block 110):

else, the mean quantity of movement of the trackers is estimated (test 122), and if it is below a given threshold i) then the trackers that would have been locked-on for some minimum number of images are transferred to "gold" mode, ii) the reference positions are stored, and iii) the algorithm is maintained in corner-detector mode (block 124).

Once more, image processing comes to an end with updating the pyramid of images (block 112).

What is claimed is:

1. A method of evaluating the horizontal translation speed of a drone, in particular rotary wing drone capable of hovering flight under autopilot, the drone comprising:

an altimeter suitable for measuring the altitude of the drone relative to the terrain over which the drone is flying; and a downwardly-looking vertically-oriented video camera suitable for picking up successive digital images of a scene of said terrain;

the method comprising estimating the movement of the scene picked up by the camera from one image to the next, and applying to said estimated movement a scale factor that is a function of the measured altitude, estimation of the movement comprising:

periodically and continuously updating a multiresolution representation of the pyramid of images type that models a given picked-up image of the scene at different, successively-decreasing resolutions; and for each new picked-up image, applying an optical flow type iterative algorithm to said multiresolution representation for estimating the differential movement of the scene from one image to the next;

the method further comprising:

obtaining, from the data produced by the optical-flow algorithm at least one texturing parameter representative of the level of microcontrasts in the picked-up scene and derived from the matrix:

$$\begin{bmatrix} \sum_E I_x^2 & \sum_E I_x I_y \\ \sum_E I_x I_y & \sum_E I_y^2 \end{bmatrix}$$

of the gradient components of the image, where $I_x$ and $I_y$ are the gradient components of the image and E is the set of points to which the gradient presents a norm greater than a predetermined first useful threshold;

obtaining an approximation of the horizontal translation speed of the drone;

applying a first battery of predetermined criteria to said texturing parameter(s) and to said speed approximation; and if said first battery of predetermined criteria is satisfied, switching from the optical-flow algorithm to an algorithm of the corner detector type in order to estimate the differential movement of the scene from one image to the next.

2. The method of claim 1, wherein said at least one texturing parameter is the value of the trace of said matrix of the gradient components of the image.

3. The method of claim 1, wherein said at least one texturing parameter is the cardinal number of said set E of points for which the gradient presents a norm that is greater than a first predetermined useful threshold.

4. The method of claim 1, wherein said at least one texturing parameter is the value of the trace of said matrix of the gradient components of the image, and at least one said texturing parameter is the cardinal number of said set E of points for which the gradient presents a norm that is greater than a first predetermined useful threshold, and wherein said first battery of predetermined criteria for deciding whether to switch from the optical-flow algorithm to the corner-detector algorithm comprises the following conditions cumulatively:

the value of said trace is greater than a second given threshold; and the value of said cardinal number is greater than a third given threshold; and the speed estimate is less than a fourth given threshold.

5. The method of claim 1, wherein, when the selected algorithm is the corner-detector algorithm and the speed approximation is less than an additional threshold, the method further comprises adapting the corner-detector algorithm by modifying, for at least some selected trackers, the search parameters of the tracker and the dimensions of the search zone in the image in a restrictive direction.

6. The method of claim 1, further comprising, when the selected algorithm is the corner-detector algorithm and the speed approximation is less than an additional threshold, activating an autopilot mode of servo-controlling the drone in position.

7. The method of claim 1, also comprising, after switching to the corner-detector algorithm:

obtaining from data produced by the corner-detector algorithm, at least one parameter representative of the risk of failure in estimating the differential movement of the scene from one image to the next by the corner-detector algorithm;

obtaining an approximation of the horizontal translation speed of the drone;

applying a second battery of predetermined criteria to said failure risk parameter(s) and to said speed approximation; and if said second battery of predetermined criteria is satisfied, switching back to the optical-flow algorithm in order to estimate the differential movement of the scene from one image to the next.

8. The method of claim 7, wherein said failure risk parameter comprises the number of locked-on trackers used by the corner-detector algorithm.

9. The method of claim 8, wherein said second battery of predetermined criteria for deciding whether to switch back to the optical-flow algorithm comprises either of the following conditions:
   the number of locked-on trackers is less than a first additional given threshold; or
   the speed estimate is greater than a second additional given threshold.

10. The method of claim 1, further including counting the number of successive images that have been picked up since switching from a first algorithm, the optical-flow algorithm or the corner-detector algorithm, to the other algorithm, and making any return to the first algorithm conditional on counting some minimum number of images since said switch to said other algorithm.q

\* \* \* \* \*

UNITED STATES PATENT AND TRADEMARK OFFICE
CERTIFICATE OF CORRECTION

PATENT NO. : 8,498,447 B2
APPLICATION NO. : 13/156076
DATED : July 30, 2013
INVENTOR(S) : Thomas Derbanne It is certified that error appears in the above-identified patent and that said Letters Patent is hereby corrected as shown below:

In the Claims:

At Column 15, line 22, please replace the phrase "said other algorithm.q" with -- said other algorithm. -- such that Claim 10 reads:

The method of claim 1, further including counting the number of successive images that have been picked up since switching from a first algorithm, the optical-flow algorithm or the corner-detector algorithm, to the other algorithm, and making any return to the first algorithm conditional on counting some minimum number of images since said switch to said other algorithm.

Signed and Sealed this
Twelfth Day of November, 2013

Teresa Stanek Rea
*Deputy Director of the United States Patent and Trademark Office*